（12) United States Patent
Hatipoglu et al.

(10) Patent No.: US 7,520,572 B2
(45) Date of Patent: Apr. 21, 2009

(54) USE OF ECU TO CONTROL BRAKE VALVE ACTUATOR

(75) Inventors: Cem Hatipoglu, Rocky River, OH (US); Charles E. Eberling, Wellington, OH (US); Mark A. Bennett, Grafton, OH (US)

(73) Assignee: Bendix Commerical Vehicle Systems LLC, Elyria, OH (US)

( * ) Notice: Subject to any disclaimer, the term of this patent is extended or adjusted under 35 U.S.C. 154(b) by 0 days.

(21) Appl. No.: 11/492,439

(22) Filed: Jul. 25, 2006

(65) Prior Publication Data

US 2006/0261670 A1   Nov. 23, 2006

Related U.S. Application Data

(63) Continuation of application No. 10/816,604, filed on Apr. 2, 2004, now abandoned.

(51) Int. Cl.
*B60T 13/74* (2006.01)
*B60T 8/18* (2006.01)
(52) U.S. Cl. .................. 303/3; 303/15; 303/20
(58) Field of Classification Search .............. 303/3, 303/6.1, 15, 127, 128, 131, 132, 133, 135, 303/139, 140, 146, 147, 151, 155, 167, 113.1, 303/113.2, 113.5, 115.1, 115.2, 118.1, 20, 303/22.8
See application file for complete search history.

(56) References Cited

U.S. PATENT DOCUMENTS

| | | | |
|---|---|---|---|
| 3,498,422 A | * | 3/1970 | Heinz ................ 188/181 T |
| 4,260,199 A | | 4/1981 | Reinecke |
| 4,632,466 A | | 12/1986 | Grauel et al. |
| 4,818,035 A | | 4/1989 | McNinch, Jr. |
| 5,012,417 A | | 4/1991 | Watanabe et al. |
| 5,024,491 A | * | 6/1991 | Pease et al. ................ 303/195 |

(Continued)

FOREIGN PATENT DOCUMENTS

DE    2520356 A1    11/1976

(Continued)

OTHER PUBLICATIONS

International Search Report and Written Opinion for PCT/US2005/009513.

(Continued)

*Primary Examiner*—Melody M Burch
(74) *Attorney, Agent, or Firm*—Calfee, Halter & Griswold LLP

(57) ABSTRACT

A brake valve actuator (BVA) of a vehicle is controlled by an electronic control unit (ECU) to provide automatic traction control (ATC), roll stability (RS) and yaw stability (YS) functions for the vehicle, by actuating the dual brake valve without driver intervention. The ATC function is provided by making braking pressure available at the driven wheels only of the vehicle. This may be done by selectively controlling the modulators for the driven wheels and the non-driven wheels of the vehicle. The ATC function in this manner can be provided for a straight truck or bus, or for a tractor and trailer, without the need for an ATC solenoid. In another embodiment, a yaw control function is provided, without the need for ATC solenoids or for pressure sensors in the delivery lines. In yet another embodiment, yaw control benefits are provided with an additional sensor.

11 Claims, 4 Drawing Sheets

U.S. PATENT DOCUMENTS

| | | | |
|---|---|---|---|
| 5,126,997 A | | 6/1992 | Fukuda et al. |
| 5,295,736 A | * | 3/1994 | Brearley .................. 303/7 |
| 5,427,440 A | * | 6/1995 | Ward et al. .................. 303/3 |
| 5,443,306 A | * | 8/1995 | Broome .................. 303/3 |
| 6,272,417 B1 | * | 8/2001 | Ross et al. .................. 701/71 |
| 6,644,758 B1 | | 11/2003 | Stumpe |
| 6,659,244 B2 | | 12/2003 | Goodell |
| 6,702,400 B1 | * | 3/2004 | Eberling .................. 303/6.1 |
| 6,758,298 B2 | | 7/2004 | Eberling et al. |
| 2002/0189882 A1 | * | 12/2002 | Eberling et al. ............. 180/281 |

FOREIGN PATENT DOCUMENTS

| | | |
|---|---|---|
| FR | 2 206217 | 6/1974 |
| WO | WO 2005/040656 A1 | 5/2005 |

OTHER PUBLICATIONS

Bendix Service Data SD-03-3611, Bendix PP-1, PP-2, PP-5, PP-8 & RD-3 Push-Pull Type Control Valves brochure, Mar. 2004, 4 pgs.

Bendix Service Data SD-03-817, Bendix E-6 & E-10 Dual Brake Valves, Mar. 2004, 8 pgs.

* cited by examiner

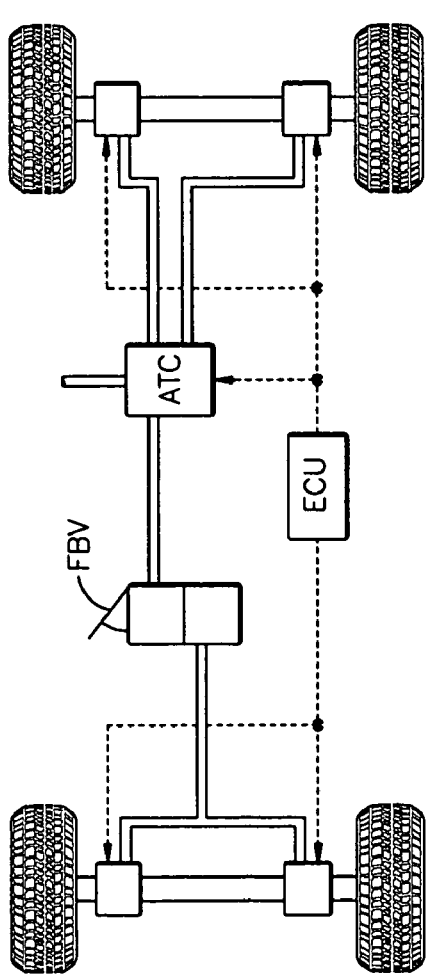
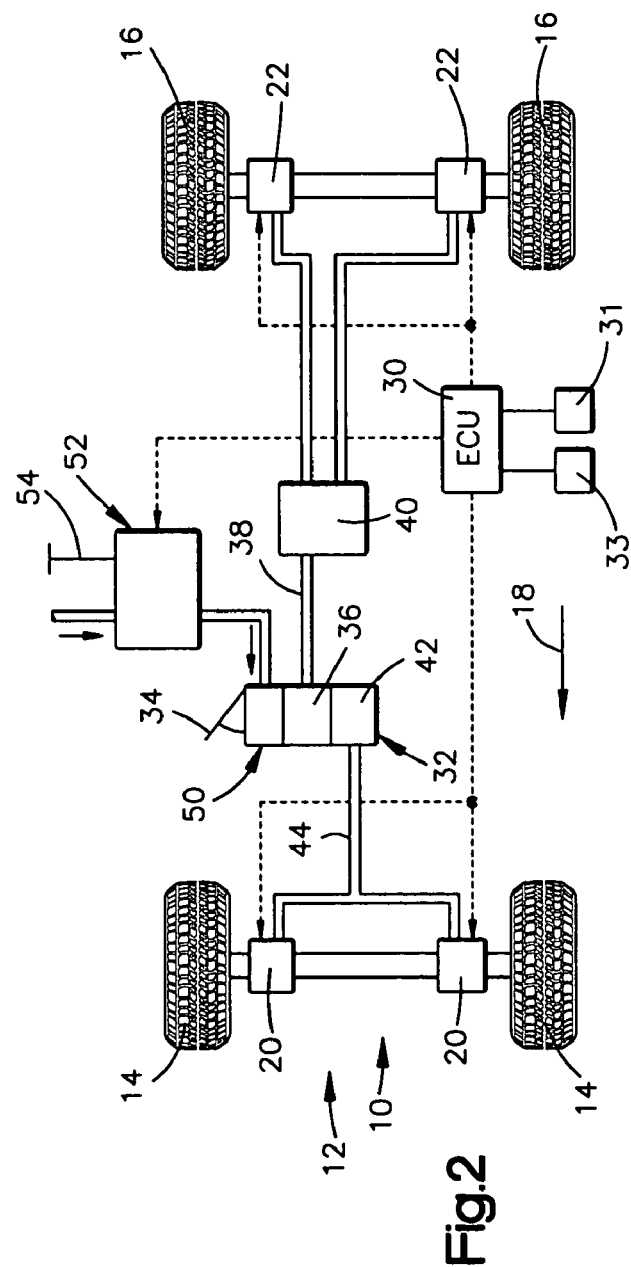
Fig.1 PRIOR ART
Fig.2

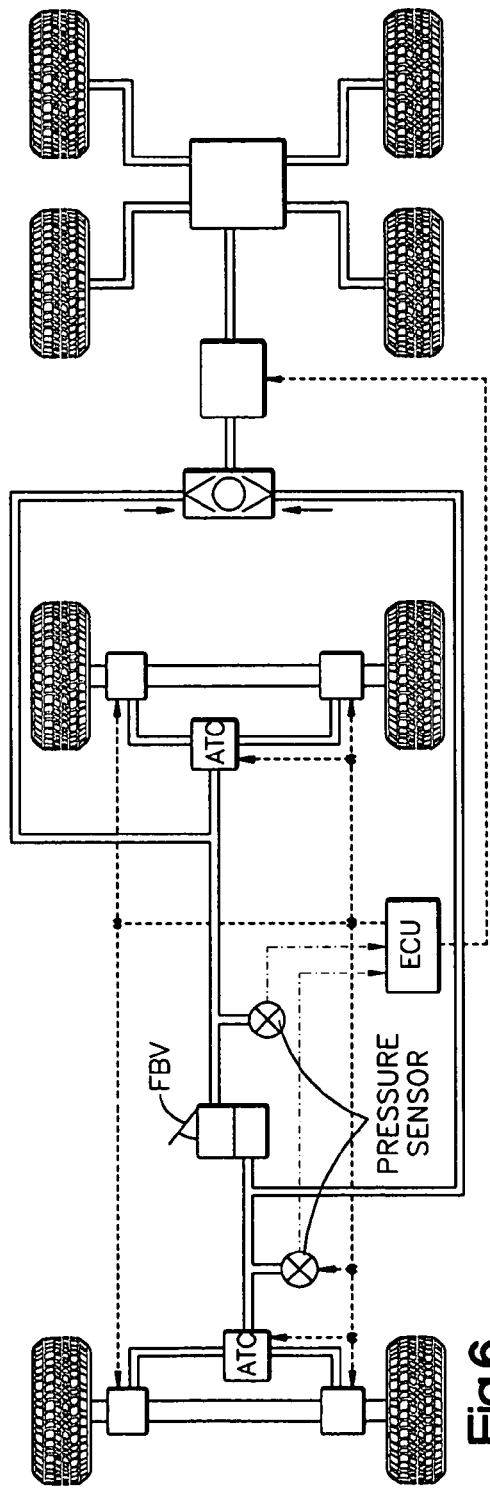
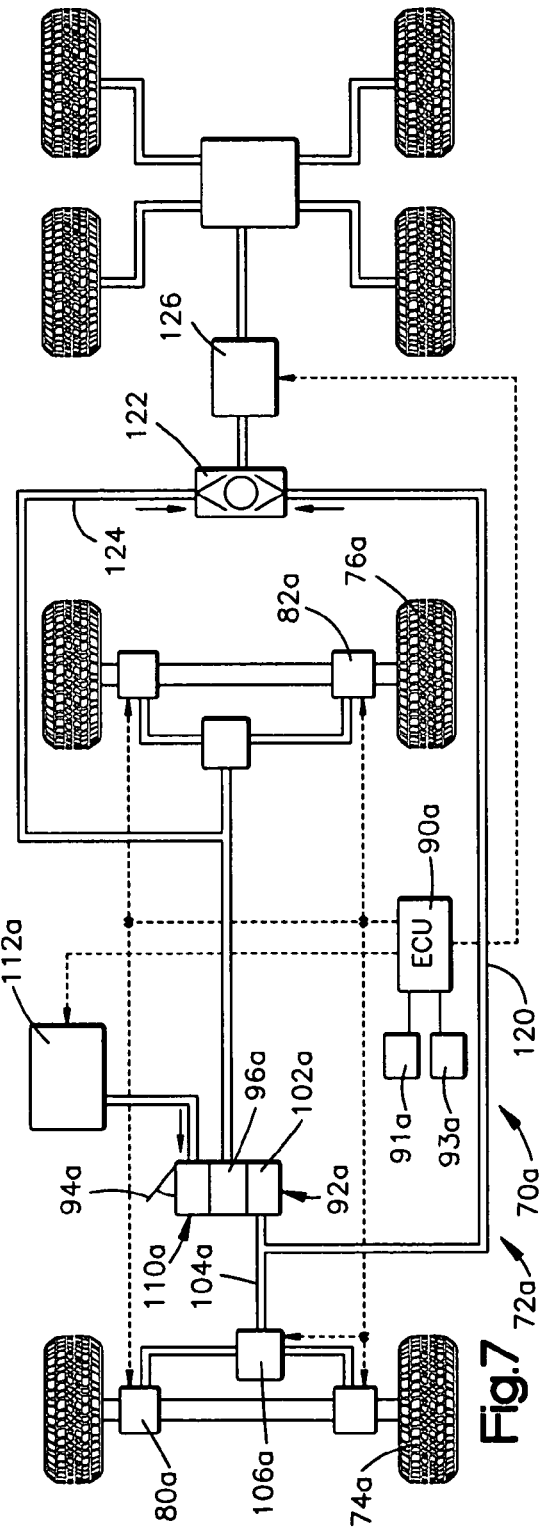
Fig.6 PRIOR ART
Fig.7

USE OF ECU TO CONTROL BRAKE VALVE ACTUATOR

CROSS-REFERENCE TO RELATED APPLICATIONS

The present application is a continuation of, and claims the benefit of, U.S. application Ser. No. 10/816,604, now abandoned, which was filed Apr. 2, 2004 which is incorporated herein by reference in its entirety.

BACKGROUND OF THE INVENTION

The present invention relates to a braking system for a vehicle. In particular, the present invention relates to the provision of an automatic traction control (ATC) function and a roll stability (RS) function with a vehicle braking system.

A typical vehicle braking system for a straight truck, bus, tractor, or trailer, includes a source of pressurized air along with valves for selectively directing the air to brake chambers at the wheels of the vehicle. Many such vehicle braking systems provide an antilock braking system (ABS) function, by which an electronic control unit (ECU) selectively releases and applies braking at individual wheels to prevent wheel lockup.

Some vehicle braking systems also provide an automatic traction control (ATC) function. In one aspect of ATC, an electronic control unit (ECU) selectively applies braking at individual wheels to match wheel speeds side to side to help control wheel spin that occurs in response to driver demand via the accelerator pedal. This control is typically effected by controlling a wheel end modulator associated with the wheel. The modulator provides an air flow path to the wheel that can be rapidly opened or closed by a solenoid under the control of the ECU.

In order to provide the ATC function, high pressure air must be made available at the modulators in the absence of driver demand. This is typically done by having a constant supply of high pressure air from the reservoir to an ATC solenoid that is associated with the modulators on the driven axle. In an ATC event, the ATC solenoid is energized under the control of the ECU to direct the high pressure air from the reservoir to the modulators. The modulators are then controlled by the ECU selectively to apply and release braking force to the wheels, to control any wheel spin.

As one example, FIG. 1 shows schematically some portions of a prior art vehicle braking system that is operative to provide ATC on a straight truck, or bus. The system is also ABS effective. The system includes a foot brake valve (FBV) that normally provides driver demand proportioned air pressure as a control air flow to a relay valve (designated ATC) associated with the driven wheels of the vehicle. The relay valve includes an ATC solenoid that is controlled by an ECU. The ATC solenoid is normally de-energized, in which case driver demand proportioned air is used as the control pressure on the relay valve, to control the flow of air from the reservoir to the rear axle modulators. When the ECU determines that the traction control function is desired, the ECU energizes the ATC solenoid on the relay valve, which opens the relay valve immediately, in spite of the lack of driver demand controlled pressure. Reservoir air pressure is provided to the rear modulators. The rear modulators, under the control of the ECU, use that air to modulate brake pressure in the brake actuators, thus controlling the spinning of the rear wheels.

Vehicle air brake systems typically include a primary circuit, which is often used for driven wheels, and a secondary circuit, which is often used for non-driven wheels. The vehicle has a dual brake valve, or foot brake valve (FBV), which is a valve in both the primary circuit and the secondary circuit that is controlled by the foot pedal (brake pedal) of the vehicle in response to driver demand for braking. The dual brake valve is supplied with high pressure air from one or more reservoirs. When the valve is actuated by driver applied force on the brake pedal, this high pressure air is directed into the primary and secondary braking circuits of the vehicle.

Some vehicles with dual brake valves also have a brake valve actuator (BVA), which is an actuatable device interposed between the valve and the brake pedal that applies enough force to the brake valve so that the brake valve's output (delivery pressure to the primary and secondary circuits) is at least 85 psi. The BVA is operated (piloted by, or receives a pneumatic control signal from) either (a) a pneumatic on/off control valve actuated by the driver's hand like a switch, or (b) an on/off solenoid valve controlled by an on/off electrical switch operated by the driver's hand. The BVA is used to conduct a pre-trip inspection, in which the brakes are set and held in an applied condition so that the driver can check the braking system of the vehicle without having to be in the cab pressing on the brake pedal. U.S. Pat. No. 6,659,244 shows the use of a brake valve actuator in a vehicle air braking system.

SUMMARY OF THE INVENTION

In accordance with the invention, the brake valve actuator (BVA) of a vehicle is controlled by an ECU to provide ATC, yaw stability (YS) and ESP functions for the vehicle. These functions require supply (reservoir) air to be available to the vehicle's wheel end modulators in the absence of driver demand (brake pedal movement). In accordance with the invention, this is effected by having the ECU control the BVA to actuate the dual brake valve without driver intervention.

In one embodiment, the ATC function is provided by making braking pressure available at the driven wheels only of the vehicle. This may be done by blocking the modulators for the non-driven wheels so that no braking effect is provided at the non-driven wheels. At the same time, the modulators for the driven wheels are controlled to enable selective braking, under control of the ECU, of the driven wheels. The ATC function in this manner can be provided for a straight truck or bus, or for a tractor and trailer, without the need for an ATC solenoid. For a tractor and trailer, there is a need to be able to stop pressure delivery to the trailer, which is typically met by a standard modulator controlling the trailer delivery directly from the brake ECU.

That is, since the modulators for the non-driven wheels can hold, and not allow any new pressure to go to their associated brakes, the system can supply full air pressure to them, and allow the modulators to block it. The system can use the existing brake valve (under control of the BVA) to provide the supply air, and so there is no need for an ATC valve for either the driven or non-driven wheels.

In another embodiment, the RS function is provided, without the need for ATC solenoids or for pressure sensors in the delivery lines.

BRIEF DESCRIPTION OF THE DRAWINGS

The foregoing and other features of the present invention will become apparent upon consideration of the following description of the invention with reference to the accompanying drawings, in which:

FIG. 1 is a schematic illustration of a prior art braking system for a straight truck or bus, having an ATC capability;

FIG. 2 is a schematic illustration of a braking system in accordance with a first embodiment of the invention for a straight truck or bus, having an ATC capability;

FIG. 6 is a schematic illustration of a prior art braking system for a tractor and trailer, having an RS capability; and FIG. 7 is a schematic illustration of a braking system in accordance with a third embodiment of the invention for a tractor and trailer, having an RS capability.

DETAILED DESCRIPTION OF THE INVENTION

Figure 3:
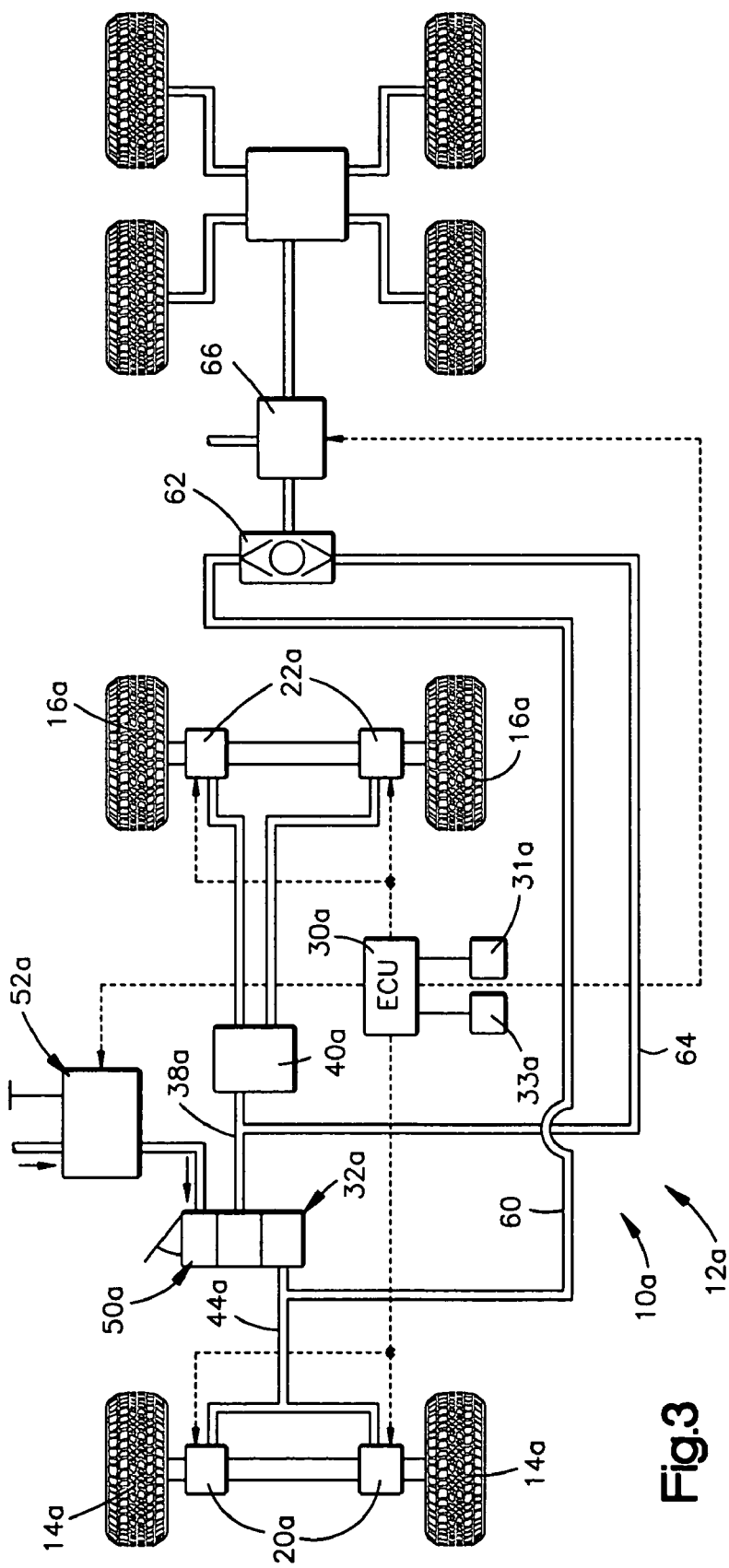
FIG. 3 is a schematic illustration of a braking system in accordance with a second embodiment of the invention for a tractor and trailer, having an ATC capability.

The present invention relates to a braking system for a vehicle. In particular, the present invention relates to a vehicle braking system that provides an automatic traction control (ATC) function. The invention is applicable to braking systems of differing constructions. For example, the invention is applicable braking systems for vehicles having only two axles, with either one or both axles being driven; to vehicles having more than two axles with one or more being driven; and to vehicles (such as trailers) having no driven axles. As representative of the invention, FIG. 2 illustrates a vehicle braking system 10 constructed in accordance with a first embodiment of the invention.

The braking system 10 forms a part of a vehicle 12 having non-driven wheels 14 and driven wheels 16. The illustrated vehicle 12 is a rear wheel drive vehicle and so a forward direction in the vehicle is indicated by the arrow 18. The arrangement of driven wheels 16 and non-driven wheels 14 could be different in other vehicles, for example, in a front wheel drive vehicle.

Two ABS wheel end modulators 20 are associated with the non-driven wheels 14. Two ABS wheel end modulators 22 are associated with the driven wheels 16. All of the modulators 20 and 22 are controlled by an ECU 30.

The vehicle includes a foot brake valve 32 for controlling flow of pressurized air from one or more reservoirs (not shown) to the modulators 20 and 22. The foot brake valve 32 is actuated by the vehicle brake pedal 34.

The foot brake valve 32 has a primary chamber 36 that is located in a primary circuit 38 of the vehicle braking system 10. The primary circuit 38 also includes a relay valve 40, between the foot brake valve 32 and the modulators 22. The primary circuit 38 controls braking on the driven wheels 16. Specifically, when the brake valve 32 is actuated, air at a pressure determined by the amount of actuation of the brake pedal 34 is directed from the primary chamber 36 to the relay valve 40 as control air to actuate the relay valve. The relay valve 40, when actuated, directs air from a primary reservoir (not shown) to the modulators 22 of the driven wheels 16.

The foot brake valve 32 has a secondary chamber 42 that is located in a secondary circuit 44 of the vehicle braking system 10. The secondary circuit 44 controls braking on the non-driven wheels 14. Specifically, when the brake valve 32 is actuated, air from a secondary reservoir (not shown) flows through the secondary chamber 42 to the modulators 20 of the non-driven wheels 14, at a pressure determined by the amount of actuation of the brake pedal 34.

The system 10 includes a brake valve actuator (BVA) 50. The BVA 50 is an actuatable device interposed between the brake valve and the brake pedal. The BVA 50 is controlled by a BVA controller 52 that is provided with supply air.

The BVA controller 52 is operated (piloted by, or receives a pneumatic control signal from) an actuator 54 that may be either a pneumatic on/off control valve actuated by the driver's hand like a switch, or (b) an on/off solenoid valve controlled by an on/off electrical switch operated by the driver's hand. The controller 52, when actuated, directs supply air to the BVA 50 to actuate the BVA and, thereby, actuate the dual brake valve 32.

The BVA 50 may be used in a known manner for conducting a pre-trip inspection, in which the brakes are set and held in an applied condition so that the driver can check the braking system of the vehicle without having to be in the cab pressing on the brake pedal 34.

In accordance with a feature of the present invention, the BVA controller 52 is also operated by the ECU 30. Specifically, the ECU 30 is operative to actuate the BVA controller 52, independently of controller actuation (described above) that results from driver input.

The ECU 30 is provided with inputs from one or more sensors for sensing a dynamic vehicle condition for which it may be desirable to make braking pressure available to the driven or non-driven wheels of the vehicle, independently of driver demand. Specifically, the ECU 30 may be provided with input from one or more wheel spin sensors 31, associated with the driven wheels of the vehicle and the non-driven wheels of the vehicle. The ECU 30 may also be provided with input from one or more rollover condition sensors 33 that are operative to sense conditions such as lateral acceleration that are indicative of a possible rollover condition of the vehicle. Other types of sensor inputs may be provided, in addition or alternatively.

Should wheel spin at the driven wheels 16 be sensed, the ECU 30 may determine that the automatic traction control (ATC) function of the system 10 should be provided to stop the wheel spin. If such a determination is made, the ECU 30 electrically actuates the BVA controller 52. The BVA controller 52 directs supply air to the BVA 50, thereby actuating the BVA. The BVA 50 actuates the dual brake valve 32.

When the dual brake valve 32 is thus actuated by the ECU 30, air from the secondary reservoir flows through the secondary chamber 42 to the modulators 20 of the non-driven wheels 14. The ECU 30 when in the ATC mode controls the modulators 22 to block flow of air to the brake chambers of the non-driven wheels 14. Therefore, no braking effect is provided at the non-driven wheels 14, as is desired.

When the dual brake valve 32 is thus actuated by the ECU 30, air under pressure is directed from the primary chamber 36 to the relay valve 40 as control air, thus actuating the relay valve. The relay valve 40 when actuated directs air from the primary reservoir to the modulators 22 of the driven wheels 16. The ECU 30 when in the ATC mode selectively controls the modulators 22 associated with the driven wheels 16 to enable flow of air to the brake chambers of the driven wheels. Braking effect is provided as desired at the driven wheels 16, to stop the wheel spin. The braking effect can be applied and released under the control of the ECU 30.

The application of braking effect to the driven wheels 16 is done without any driver input, that is, without pressing on the brake pedal 34. Thus, the automatic traction control function is provided. Because the brake valve actuator 50 is used to energize the primary braking circuit 38, a standard relay valve 40 can be used in the primary circuit, rather than a relay valve with an ATC solenoid.

This feature of the invention thus takes advantage of the fact that the vehicle 12 already has a device (the BVA 50)

which is operative to energize the vehicle braking system 10 in the absence of brake pedal actuation. Putting this device 50 under the control of the ECU 30 enables the provision of braking effect under computer control and thus enables the provision of the automatic traction control function, without the need for the more complex and expensive ATC hardware shown in FIG. 1.

Being able to control the BVA 50 with the ECU 30 provides additional advantages. The ECU 30 can control operation of the BVA 50 so that it is not erroneously actuated, for example by the pre-trip solenoid when the vehicle 12 is moving.

The service brakes can also be applied using the ECU 30 to control the BVA 50. Some vehicles include an "Autobrake" function by which service brakes are automatically applied by actuating the BVA 50, in certain circumstances. For example, the service brakes of a school bus might be automatically applied when the school bus door is opened with the lights flashing. In such a vehicle, the ECU 30 can be programmed to disable this function when it is not safe to have it in effect—for example, while the vehicle is moving. Other BVA functions can also be disabled in such circumstances, for example, the pre-trip function, or any other brake actuation other than the one provided for by the driver's foot or hand control. Thus, putting the BVA 50 under control of the ECU 30 adds functionality to the BVA in the form of a safety interlock to prevent misuse of the brakes via the BVA.

FIG. 3 illustrates schematically a vehicle braking system 10a constructed in accordance with a second embodiment of the invention. The braking system 10a is similar to the braking system 10 (FIG. 2) and parts that are the same or similar in function are given the same reference numerals with the suffix "a" added.

The system 10a is used on a tractor-trailer combination. The parts of the system 10a that are used for braking control on the tractor are the same as those shown in FIG. 2. In addition, an extra air line 60 is taken off the delivery from the secondary circuit 44a, going back to a double check valve 62 normally found in a conventional tractor trailer protection valve. Another air line 64 is taken off the delivery from the primary circuit 38a, going back to the double check valve 62. The higher of these two lines 60 and 64, at the double check valve 62, provides the input/control to the trailer, in a known, standard manner.

The pressure that is passed through from the double check valve 62 goes to a solenoid-controlled trailer control valve 66 that is an on-off valve. During an ATC event, the ECU 30 controls the valve 66 to block application of braking effect to the wheels of the trailer. When an ATC event is not in progress, the ECU 30a controls the valve 66 to enable application of braking effect to the wheels of the trailer in the usual manner.

With the system 10a, the vehicle brake lights are controlled through the ECU 30a, during an ATC event. This prevents energizing the brake lights due to brake actuation, when the vehicle is 12a not being slowed.

In accordance with another aspect of the invention, just as the ECU 30a blocks the front axles from braking when traction control is desired, the ECU can in an ATC situation selectively block braking effect at all of the tractor's axles, thus allowing braking effect only to the trailer's axles.

The other advantages of the system 10 apply also to the system 10a. For example, as with the system 10 (FIG. 2), the system 10a (FIG. 3) does not need the conventional ATC solenoid, and retains the pre-trip inspection capability of the BVA.

In accordance with another aspect of the invention, a roll stability control or roll stability (RS) function can be provided for a straight-truck or bus having a BVA, with reduced cost and complexity compared to standard braking systems that provide such a function.

Figure 4:
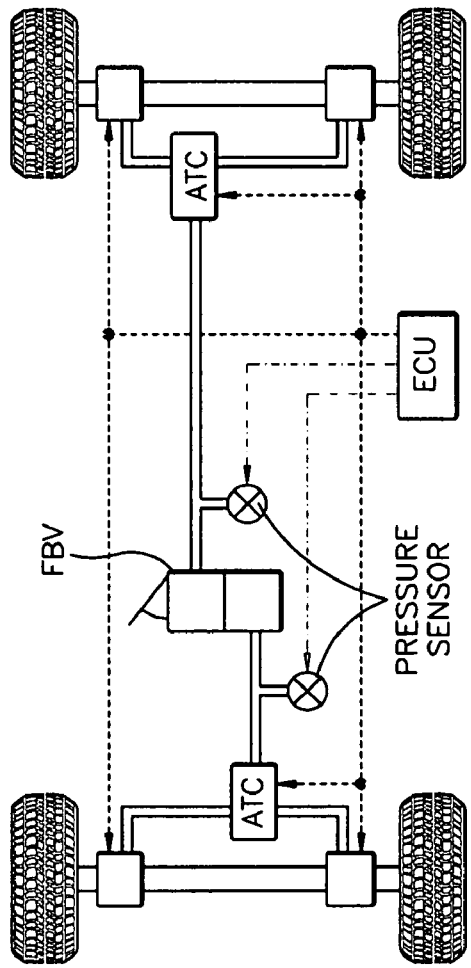
FIG. 4 is a schematic illustration of a prior art braking system for a straight truck or bus, having an RS capability.

FIG. 4 shows one prior art hardware arrangement that is used for obtaining RS on a straight truck or bus (no trailer). The primary circuit of the dual brake valve provides driver control pressure to a relay valve (designated ATC) having an ATC solenoid, associated with the driven wheels. Supply air from the primary reservoir (not shown), as passed by the relay valve, goes to the vehicle's rear (to the right as viewed in FIG. 4) ABS wheel end modulators. The solenoid on the relay valve, and the modulators, are under the control of the ECU.

The secondary circuit of the dual brake valve provides driver control pressure to a relay valve having an ATC solenoid, associated with the non-driven (front) wheels. Supply air from the secondary reservoir (not shown), as passed by the relay valve, goes to the vehicle's front ABS wheel end modulators. The solenoid on the relay valve, and the modulators, are under the control of the ECU. Because both the front and rear relay valves are controllable by ATC solenoids, they have reservoir air going to them, bypassing the dual brake valve, and so they can be actuated at any time with or without driver intervention, to brake the wheels.

In the prior art system shown in FIG. 4, the rear wheels (or driven wheels) are controllable in this manner for ABS and ATC and electronic stability functions, and also for the RS function (to be described below). When the RS function is initiated, braking effect is provided at all wheels, and the ABS function is used simultaneously to prevent wheel lockup. The front wheels (or non-driven wheels) are controllable in this manner for ABS and yaw stability functions only.

The prior art system shown in FIG. 4 also includes a pressure sensor in the secondary delivery line and a pressure sensor in the primary delivery line. These sensors sense the pressure at the delivery of the brake valve, to indicate driver demand, and deliver that indication as input to the ECU to use in controlling the event. This also indicates the potential pressure that can be delivered to the brake chambers, so that the ECU can select between driver requested pressure and RS requested pressure. This prior art system thus requires, on top of the ABS hardware, two pressure sensors and two ATC solenoids, in order to be able to perform RS function robustly.

If sufficient pressure is present, that generally means the driver is trying to make a controlled stop, and therefore ATC should be disabled. Similarly, for RS, if the driver requested pressure exceeds the autonomous pressure being applied by the RS system, full braking control is given to the driver. As such, the higher of the driver requested pressure and the RS requested pressure is always provided to the wheels.

When the ECU senses an event, it controls the two ATC solenoids thereby to provide braking pressure to the modulators associated with the primary and secondary circuits of the service brake system, in spite of no driver demand. The ECU controls all wheel end modulators to control all of the wheels independently front/back and left/right to provide the needed braking action to slow and/or stabilize the vehicle.

Figure 5:
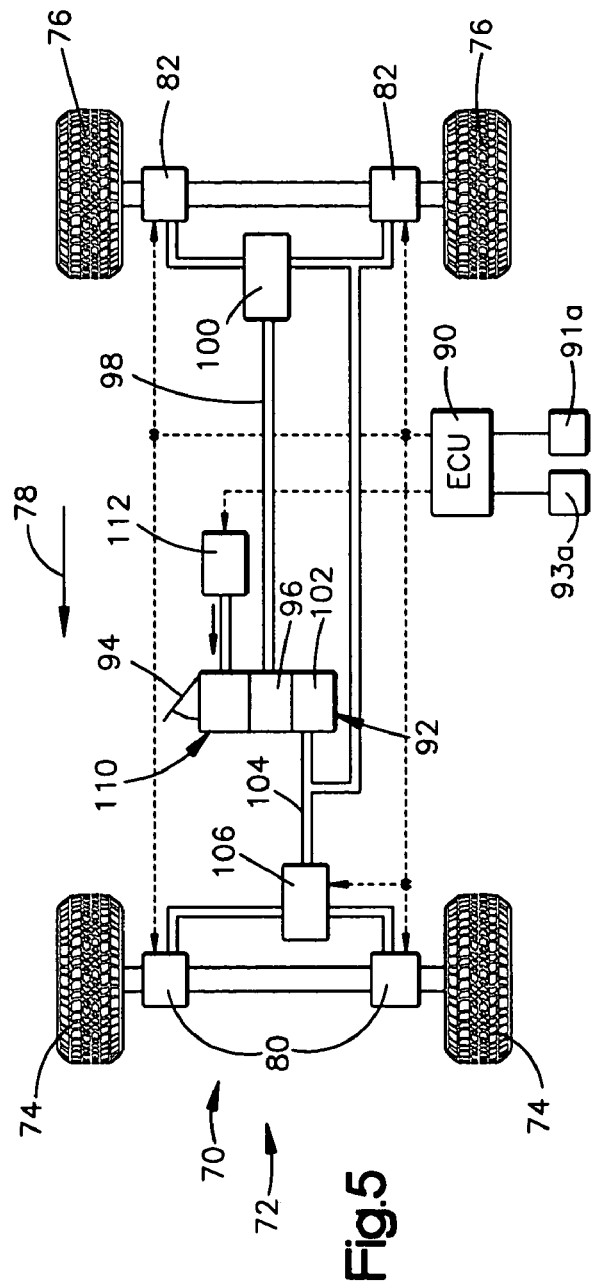
FIG. 5 is a schematic illustration of a braking system in accordance with a third embodiment of the invention for a straight truck or bus, having an RS capability.

FIG. 5 illustrates schematically a vehicle braking system 70 constructed in accordance with a third embodiment of the invention. The system 70 provides an RS function on a straight truck, or bus, using BVA actuation.

The braking system 70 forms a part of a vehicle 72 having non-driven wheels 74 and driven wheels 76. The illustrated vehicle is a rear wheel drive vehicle and so a forward direction in the vehicle is indicated by the arrow 78. The arrangement of driven wheels 76 and non-driven wheels 74 could be different in other vehicles, for example, in a front wheel drive vehicle.

Two ABS wheel end modulators 80 are associated with the non-driven wheels 74. Two ABS wheel end modulators 82 are associated with the driven wheels 76. All of the modulators 80 and 82 are controlled by an ECU 90.

The ECU 90 is provided with inputs from one or more sensors for sensing a dynamic vehicle condition for which it may be desirable to make braking pressure available to the driven or non-driven wheels of the vehicle, independently of driver demand. Specifically, the ECU 90 may be provided with input from one or more wheel speed sensors 91*a*, associated with the driven wheels of the vehicle and the non-driven wheels of the vehicle. The ECU 90 may also be provided with input from one or more rollover condition sensors 93*a* that are operative to sense conditions such as lateral acceleration that are indicative of a possible rollover condition of the vehicle. Other types of sensor inputs may be provided, in addition or alternatively.

The vehicle includes a foot brake valve 92 for controlling flow of pressurized air from one or more reservoirs (not shown) to the modulators 80 and 82. The foot brake valve 92 is actuated by the vehicle brake pedal 94.

The foot brake valve 92 has a primary chamber 96 that is located in a primary circuit 98 of the vehicle braking system. The primary circuit also includes a relay valve 100, between the foot brake valve 92 and the modulators 82. The relay valve 100 does not have an ATC solenoid. The primary circuit 98 controls braking on the driven wheels 76.

The foot brake valve 92 has a secondary chamber 102 that is located in a secondary circuit 104 of the vehicle braking system 70. The secondary circuit also includes a relay valve 106, between the foot brake valve 92 and the modulators 80. The relay valve 106 does not have an ATC solenoid. The secondary circuit 98 controls braking on the non-driven wheels 74.

The system 10 also includes a brake valve actuator (BVA) 110 interposed between the brake valve 92 and the brake pedal. The BVA 110 is controlled by a solenoid valve 112 that is capable of proportional pressure application.

In accordance with one aspect of the present invention, the BVA controller 112 is operated by the ECU 90. The ECU 90 actuates the BVA 110 to provide braking pressure to all the modulators 80 and 82. Specifically, it provides the potential for braking pressure to reach all four modulators 80 and 82 via the relay valves 100 and 106. The operation is different for ATC and for RS For ATC operation, in the event of sensed wheel spin during acceleration, the ECU 90 actuates the BVA 110. The ECU 90 controls the modulators 82 on the driven axle, in a manner to apply braking effect so as to keep all wheels 76 on the driven axle spinning together, in the following manner. (This function is provided in the prior art system (FIG. 4) by energizing the ATC valves to apply the brakes on the driven wheels.)

First, the ECU 90 controls the modulators 80 on the non-driven wheels 74 so as to block air flow to the brake chambers on the non-driven wheels. Next, the ECU 90 controls the BVA 110 to apply air to both the primary and secondary circuits 98 and 104. Because the secondary circuit modulators 80 are already blocked when this application of air is provided, no braking occurs at the non-driven wheels 74. The primary circuit modulators 82 receive air just as if it were coming from an ATC valve, and they control braking of the driven wheels 76 in the known manner to provide the automatic traction control function.

To provide an RS function in the system 70, the ECU 90 may determine, in a known manner, the need to slow the vehicle to mitigate a rollover risk. The ECU 90 cuts the vehicle throttle and applies the vehicle brakes strongly, in a manner as described below. (This function is provided in the prior art system (FIG. 4) by energizing the ATC valves to apply the brakes on the driven wheels.)

The brake application in the system 70 of FIG. 5 is effected by the ECU 90 actuating the BVA 110. The actuation of the BVA 110 pulls down the brake pedal 94, proportionally. The ECU 90 controls the modulators 82 on the driven axle to provide the desired ATC function at the driven wheels 76.

If the RS function is active and the driver steps on the brake pedal 94 strongly, the system 70 can abort the RS function and return full braking control to the driver. This happens because of the "mechanical override" feature of the BVA 110, which transfers control of the dual brake valve 92 from the BVA to the brake pedal 94 when the brake pedal is depressed enough to indicate a demand for more pressure than is being provided by the BVA-controlled brake valve.

Because of this "mechanical override" feature, the system 70 does not need any pressure sensors or brake pedal sensors or switches to effect an RS abort in response to sudden driver demand. In this manner, the added cost and complexity of the prior art system shown in FIG. 4 is eliminated. The two ATC solenoids and two pressure sensors are replaced with one BVA (which may already be present on the vehicle) and one solenoid.

The ECU 90 may be operative to block braking effect at all wheels except one, in a situation in which a low pressure test pulse is provided to that one wheel to help detect imminence of a rollover situation.

In accordance with another aspect of the invention, a roll stability control or roll stability (RS) function can be provided for a tractor-trailer vehicle having a BVA, with reduced cost and complexity compared to standard braking systems that provide such a function.

FIG. 6 shows a prior art system that is used for obtaining RS on a tractor-trailer. The system is similar to the system shown in FIG. 4 for obtaining RS on a straight truck or bus. The parts that are used for braking control on the tractor are the same as those shown in FIG. 4. No brake valve actuator is used. An air line is taken off the delivery from the dual brake valve secondary circuit, going back to a double check valve. Another air line is taken off the delivery from the dual brake valve primary circuit, going back to the double check valve. The higher of these two lines provides the input/supply to the trailer, in a known, standard manner.

In the prior art system shown in FIG. 6, the pressure that is passed through from the double check valve goes to a trailer control module or solenoid. During an ATC event, the ECU controls the solenoid to block application of braking effect to the wheels of the trailer. When an ATC event is not in progress, the ECU controls it to enable application of braking effect to the wheels of the trailer in the usual manner.

This system requires, on top of the ABS hardware, two pressure sensors and two ATC solenoids, in order to be able to perform the RS function.

FIG. 7 illustrates schematically a vehicle braking system 70*a* constructed in accordance with a fourth embodiment of the invention. The system 70*a* provides an RS function on a tractor trailer combination 72*a*, using BVA actuation.

The system 70*a* is similar to the system 70 shown in FIG. 5 for obtaining RS on a straight truck or bus, and parts that are the same or similar in function are given the same reference numerals with the suffix "a" added. The parts that are used for braking control on the tractor are the same as those shown in FIG. 5, including a BVA 110*a*.

An air line 120 is taken off the delivery from the secondary circuit 104*a*, going back to a double check valve 122. Another air line 124 is taken off the delivery from the primary circuit 96a, going back to the double check valve 122. The higher of these two lines 120 and 124 provides the input/control to the trailer.

The pressure that is passed through from the double check valve 122 goes to a trailer control module or solenoid 126. During an ATC event, the ECU 90a controls the solenoid 126 to block application of braking effect to the wheels of the trailer. When an ATC event is not in progress, the ECU 90a controls it to enable application of braking effect to the wheels of the trailer.

The present invention is also applicable to ESP (electronic stability program). This function includes roll stability functions and hardware and can apply independent wheel end braking for yaw stabilization. In this case, it is necessary to provide a sensor for determining the driver's braking intention, or amount of intervention, which is not needed in the cases mentioned above.

Having described the invention, we claim:

1. A vehicle braking system for a vehicle having a brake pedal and a first braking circuit associated with driven wheels of the vehicle and having a second braking circuit associated with non-driven wheels of the vehicle, the system comprising:
    a dual brake valve operable by the vehicle brake pedal for, when actuated, simultaneously applying braking pressure to both the first and second braking circuits of the vehicle, the dual brake valve being proportionally actuatable by a vehicle operator;
    an electronic control unit;
    a manual input device that is selectively operable independently of the vehicle brake pedal and independently of the electronic control unit to produce a manual control signal;
    a brake valve actuator, for selectively actuating the dual brake valve independently of the vehicle brake pedal, responsive to (i) the manual control signal and (ii) an electronic control signal from the electronic control unit;
    at least one sensor for sensing a dynamic vehicle condition, the electronic control unit generating the electronic control signal for actuating the brake valve actuator as a function of the dynamic vehicle condition; and
    a brake valve actuator controller that is connected between the electronic control unit and the brake valve actuator and that is also connected between the manual input device and the brake valve actuator, the brake valve actuator controller being responsive to (i) the manual control signal and (ii) the electronic control signal for selectively actuating the dual brake valve independently of the vehicle brake pedal.

2. A vehicle braking system as set forth in claim 1 wherein the brake valve actuator is a pneumatically actuated device that is connected between the brake pedal and the dual brake valve.

3. A vehicle braking system as set forth in claim 1 wherein the brake valve actuator controller is provided with supply air, the brake valve actuator controller being responsive to (i) the manual control signal and (ii) the electronic control signal for selectively directing supply air to the brake valve actuator for actuating the dual brake valve independently of the vehicle brake pedal.

4. A vehicle braking system as set forth in claim 1 wherein the manual input device is a manually engageable pneumatic switch.

5. A vehicle braking system as set forth in claim 1 wherein the manual input device is a manually engageable electric switch.

6. A system as set forth in claim 1 wherein the at least one sensor is operative to sense wheel spin of a driven wheel of the vehicle, and the system is operative to make braking pressure available to the driven wheel of the vehicle.

7. A system as set forth in claim 6 further comprising a modulator between the dual brake valve and the driven wheel, the electronic control unit being operative to control the modulator to selectively make braking pressure available to the driven wheel.

8. A system as set forth in claim 7 further comprising a second modulator between the dual brake valve and a non-driven wheel of the vehicle, the electronic control unit being operative to control the second modulator to block the application of braking pressure to the non-driven wheel.

9. A method of controlling a braking function of a vehicle as a function of a dynamic vehicle condition, the vehicle having a brake pedal, an associated dual brake valve operable proportionally by the brake pedal, a brake valve actuator responsive to a manual control signal independently of the brake pedal to actuate the brake valve actuator thereby to actuate the dual brake valve, and a brake valve actuator controller connected between an electronic control unit and the brake valve actuator and that is also connected between a manual input device and the brake valve actuator, the method comprising the steps of:
    sensing the vehicle condition;
    providing the brake valve actuator controller with supply air;
    transmitting an electric control signal from the electronic control unit as a function of the vehicle condition and transmitting the electronic control signal from the electronic control unit to the brake valve actuator controller;
    for selectively directing the supply air to the brake valve actuator independent of the brake pedal, selectively actuating the brake valve actuator controller by at least one of (i) the manual control signal and (ii) the electronic control signal;
    selectively actuating the brake valve actuator, by the supply air selectively directed to the brake valve actuator independent of the brake pedal, to selectively actuate the dual brake valve independent of the brake pedal; and
    controlling a plurality of modulators in the vehicle to inhibit delivery of braking pressure to non-driven wheels of the vehicle.

10. A method as set forth in claim 9 wherein the sensing step comprises sensing wheel spin of at least one driven wheel of the vehicle, and the controlling step comprises controlling the plurality of modulators in the vehicle to enable delivery of braking pressure to the at least one driven wheel of the vehicle.

11. A method as set forth in claim 9 further comprising the step of providing a manual input to the manual input device, and energizing the brake valve actuator in response to the manual input, independently of the electronic control unit, to actuate the dual brake valve of the vehicle.

* * * * *